US011087083B1

(12) United States Patent
Rydbeck et al.

(10) Patent No.: US 11,087,083 B1
(45) Date of Patent: Aug. 10, 2021

(54) MANAGING BUNDLES OF DIGITAL OBJECTS IN AN E-PROCUREMENT SYSTEM

(71) Applicant: Coupa Software Incorporated, San Mateo, CA (US)

(72) Inventors: Carl Rydbeck, San Mateo, CA (US); Christopher Fung, Foster City, CA (US); Pouyan Assadi-Lamouki, San Francisco, CA (US)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 16/836,655

(22) Filed: Mar. 31, 2020

(51) Int. Cl.
*G06F 40/197* (2020.01)
*G06F 40/186* (2020.01)
*G06F 40/174* (2020.01)

(52) U.S. Cl.
CPC .......... *G06F 40/197* (2020.01); *G06F 40/174* (2020.01); *G06F 40/186* (2020.01)

(58) Field of Classification Search
CPC ..... G06F 40/197; G06F 40/186; G06F 40/174
USPC ........................................................ 715/224
See application file for complete search history.

(56) References Cited

U.S. PATENT DOCUMENTS

| | | | |
|---|---|---|---|
| 6,185,587 B1 * | 2/2001 | Bernardo | G06F 40/14 715/234 |
| 6,542,912 B2 | 4/2003 | Meltzer et al. | |
| 7,249,318 B1 * | 7/2007 | Corell | G06F 40/14 715/209 |
| 7,644,351 B1 * | 1/2010 | Portnoy | G06F 40/174 715/226 |
| 8,065,202 B1 | 11/2011 | Ballaro et al. | |
| 9,946,699 B1 * | 4/2018 | Dye | G06Q 30/04 |
| 2002/0133509 A1 * | 9/2002 | Johnston | G06F 40/174 |
| 2002/0161745 A1 * | 10/2002 | Call | H04L 61/157 |
| 2002/0198935 A1 * | 12/2002 | Crandall, Sr. | G06F 40/174 709/203 |
| 2003/0191719 A1 * | 10/2003 | Ginter | G06F 21/10 705/54 |
| 2004/0107118 A1 * | 6/2004 | Harnsberger | G16H 50/20 705/2 |

(Continued)

FOREIGN PATENT DOCUMENTS

CA 2339479 A1 9/2001

OTHER PUBLICATIONS

"Metadata;" Microsoft Computer Dictionary; May 1, 2002; Microsoft Press; Fifth edition; p. 425.*

(Continued)

*Primary Examiner* — Andrew R Dyer
(74) *Attorney, Agent, or Firm* — Baker Botts L.L.P.

(57) ABSTRACT

A bundle database management server computer ("system") and related methods are disclosed. In some embodiments, the system is programmed or configured with data structures and/or database records that are arranged to manage multiple bundles of digital objects for multi-tenant access under version control. The digital objects may include a template form or a form created from a template form, and each bundle may comprise at least two digital objects, where one is created from the other or executed in response to the execution of other. The system enables each bundle to be utilized and reused as a unit and readily integrated into online events involving multiple clients.

13 Claims, 10 Drawing Sheets

(56) References Cited

U.S. PATENT DOCUMENTS

| | | | |
|---|---|---|---|
| 2005/0183002 A1* | 8/2005 | Chapus | G06F 16/80 |
| | | | 715/223 |
| 2007/0136358 A1* | 6/2007 | van Wyk | G06F 40/174 |
| 2007/0192678 A1* | 8/2007 | Tang | G06F 40/174 |
| | | | 715/234 |
| 2008/0065438 A1* | 3/2008 | Lee | G06Q 10/063 |
| | | | 705/7.11 |
| 2009/0299907 A1* | 12/2009 | Cofano | G06Q 30/02 |
| | | | 705/80 |
| 2013/0031183 A1* | 1/2013 | Kumar | G06Q 30/0251 |
| | | | 709/206 |
| 2014/0298151 A1* | 10/2014 | Fitzpatrick | G06F 40/186 |
| | | | 715/226 |
| 2016/0124929 A1* | 5/2016 | Kharbanda | G06F 40/174 |
| | | | 715/223 |
| 2017/0076101 A1* | 3/2017 | Kochhar | G06F 21/6209 |
| 2017/0262422 A1* | 9/2017 | Tung | G06Q 30/0643 |
| 2017/0345028 A1* | 11/2017 | Harris | G06Q 30/0201 |
| 2017/0357628 A1* | 12/2017 | Hurley | G06F 40/186 |
| 2020/0092436 A1* | 3/2020 | Lagumbay | H04N 1/444 |

OTHER PUBLICATIONS

Passing Values from one Form to another Form in a Button Click; 2016; Stack Overflow; pp. 1-6.*

* cited by examiner

FIG. 3

Add forms

Type — 302    Name — 304

| Type | Name |
|---|---|
| App | App Name |
| Other Form | Form Name |
| Sourcing Form | Sourcing Form 124 |

Sourcing Form 1
Sourcing Form 11
Sourcing Form 111

MANAGING BUNDLES OF DIGITAL OBJECTS IN AN E-PROCUREMENT SYSTEM

FIELD OF THE DISCLOSURE

One technical field of the present disclosure is computer-implemented management of digital objects and bundles. Another technical field is support of multi-tenant, version-controlled access to such bundles. Yet another technical field is e-procurement systems implemented using software-as-a-service access techniques.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Electronic procurement systems or e-procurement systems may be implemented as software-as-a-service (SaaS) systems using distributed computer system that are programmed to provide transaction management systems involving client computers of enterprises, suppliers and other parties. Complex online events may involve many digital objects. For example, in an online procurement workflow, various interactive documents such as questionnaires, approval forms, and other supporting documents may need to be processed or analyzed. Different user accounts, such as those associated with buyer systems, may need to access similar digital objects in respective online events. It would be helpful to provide a mechanism for different user accounts to effectively manage different types of digital objects that are related in complex ways in terms of development, organization, storage, and access.

BRIEF DESCRIPTION OF THE DRAWINGS

In the drawings:

FIG. 3 illustrates one screen of a GUI for creating a bundle, including adding an existing digital object to the bundle.

DETAILED DESCRIPTION

Figure 1:
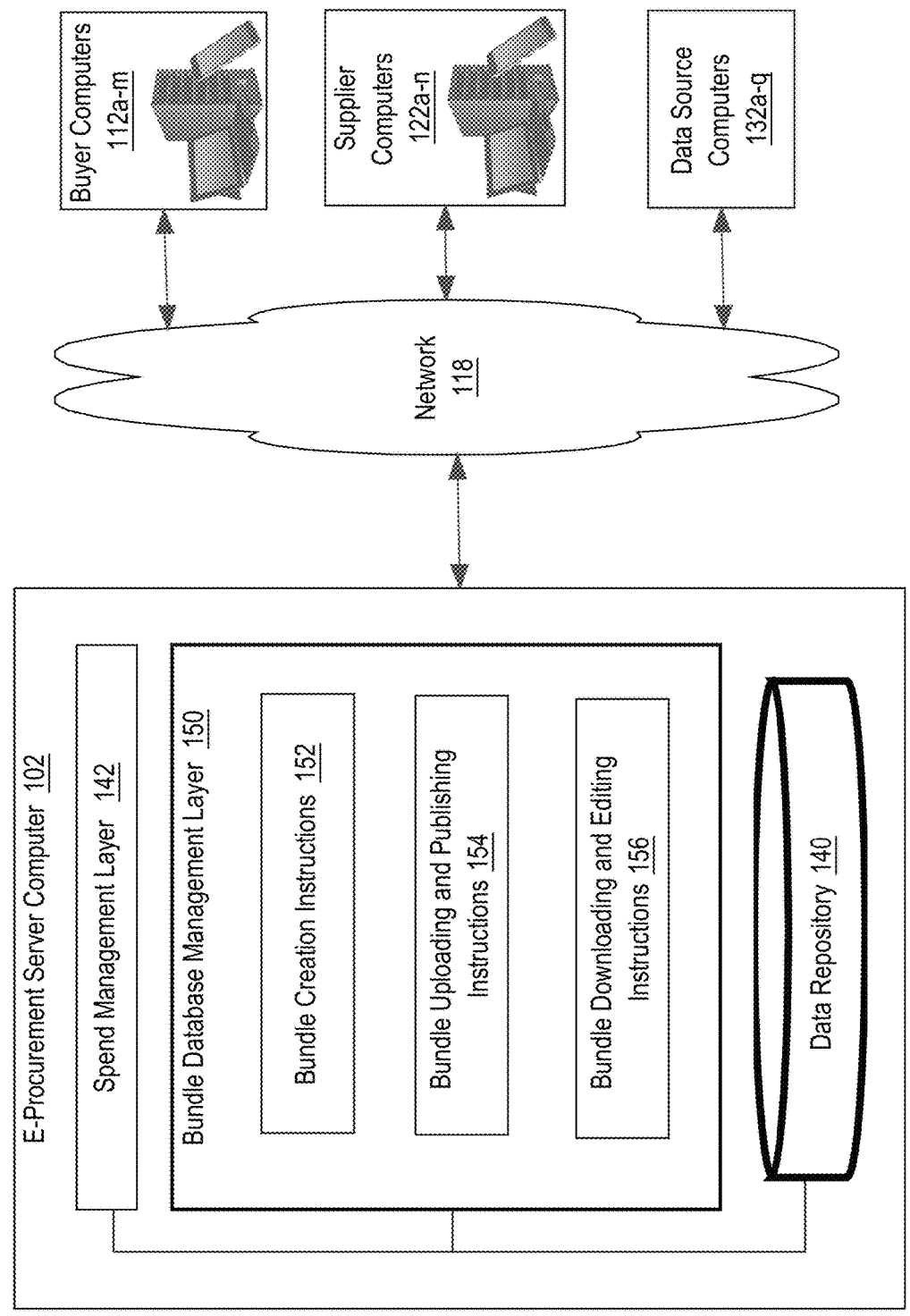
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS AND COMPUTER COMPONENTS
3. FUNCTIONAL DESCRIPTION
3.1. CREATING A BUNDLE
3.2. UPLOADING AND PUBLISHING A BUNDLE
3.3. DOWNLOADING AND EDITING A BUNDLE
4. EXAMPLE PROCESSES
5. IMPLEMENTATION EXAMPLE—HARDWARE OVERVIEW
6. EXTENSIONS AND ALTERNATIVES

1 General Overview

A bundle database management server computer system ("system") and related computer-implemented methods are disclosed to facilitate management of digital bundles, such as digital electronic documents, configuration data, templates and other digital objects that are useful in e-procurement systems. In some embodiments, the system is programmed or configured with data structures and/or database records that are arranged to manage multiple bundles of digital objects for multi-tenant access under version control. The digital objects may include a template form, or a form created from a template form, and each bundle may comprise at least two digital objects, where one is created from the other or executed in response to the execution of other. The system enables each bundle to be utilized and reused as a unit and readily integrated into online events involving multiple clients.

In some embodiments, the system is programmed to manage bundles of digital objects. Each digital object can be in an executable form or a static form. In any executable form, a digital object can be a template form, or a form created from the template form. The template form can correspond to one or more database objects with a set of attributes, and the form can correspond to a selection of a subset of the set of attributes. For example, the template form can correspond to a sourcing event with attributes related to an industry, a date range, a product type, a product name, a price range, or a geographical location. A form can be created from the template form to represent a common sourcing event having a specific date, location, multiple product names, and corresponding price ranges. A digital object can also be an approval chain in the form of a template form, a form, or a separate executable program. For example, the bundle may include a requisition order form and a purchase order form, and the approval chain would indicate how each of the two forms should be validated or approved or how the completion of one form triggers the completion of the other. The system is programmed to allow each bundle to be created, used, and reused as a single unit.

In some embodiments, the system is programmed to facilitate the creation of a bundle in a first local database managed by a first client device. The system can be programmed to transmit to the first client device a list of digital objects in a central repository for inclusion into a bundle. The system is programmed to also allow uploading a bundle from the first local database. For an upload, the system is programmed to determine how to version the uploaded bundle in the central repository. For example, the bundle could be saved as the first version of a new bundle or a higher version of an existing bundle in the central repository depending on the access permissions associated with existing bundles in the central repository. Further for the upload, the system is programmed to store data referencing a list of constituent digital objects, any new digital objects, and various types of metadata related to the version, author, upload date, access permissions, context scenarios, or other tags. The system is programmed to then allow publishing a bundle for use by all client systems subject to the access permissions.

In some embodiments, the system is programmed to alert client devices of the availability of the published bundle. The system can be programmed to communicate an alert in a context scenario associated with the published bundle. For example, when the published bundle is related to an online sourcing event, the server can be programmed to include a link to the published bundle in a webpage that provides resources to setting up a sourcing event or that enables the organization of a sourcing event. In addition, the system can be programmed to allow browsing the list of bundles in the central repository or even in the local database, providing options for downloading a bundle that does not yet exist in the local database or upload a bundle that does not yet exist in the central repository.

In some embodiments, the system is programmed to allow downloading a selected bundle from the central repository to a second local database managed by a second client device. For the download, the system is programmed to verify that the second client device is allowed to download the bundle. Before or during the download, the system is programmed to replace certain data from the selected bundle or flag certain data of the selected bundle for remapping, where the certain data may be specific to the author of the selected bundle or the associated local database. For example, the bundle may include some digital objects having items that are not stored or not yet mapped to the data stored in the central repository. The system is programmed to then cause the second client device to remap these items to data in the second local database or the central repository before the download. The system can be programmed to further allow editing the downloaded bundle, which may include adding a digital object from the central repository to the bundle, instantiating a template form in the bundle and adding the new instance to the bundle, or updating a form in the bundle. For example, a new sourcing form can be created from a template form in the bundle to now require the specification of an approver, or a form that specifies an approval chain for other forms in the bundle can be modified to identify user accounts associated with the second user device as approvers. The system is programmed to then also allow uploading the edited bundle, as discussed above.

The system produces many technical benefits. The system allows bundling of related materials and reuse of the bundles across client systems. A bundle may include a template form and a fillable form with executable rules that is created from the template form that offers a customization tool together with a customized example for increased flexibility and informativeness. The bundle may also include an approval chain that further expedites automation of a process that requires organization and validation, such as a procurement pipeline comprising sourcing, ordering, invoicing, or other steps. In addition, the further promotes reuse and enhancement of existing bundles through versioning and standardization of the bundles. Furthermore, the system promotes efficient reuse of existing bundles by notifying the bundles in appropriate contexts.

The present disclosure explains embodiments and implementations of apparatus, systems, software and data processing methods that are capable of working. However, embodiments or implementations described herein do not necessarily derive from, describe or correspond to any particular commercial product or service that may be associated with or offered by the inventors, their assignee or the applicant company.

2. Example Computing Environments and Computer Components

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises an e-procurement server computer 102 or server, one or more supplier computers 122*a-n*, one or more buyer computers 112*a-m*, and one or more data source computers 132, which are communicatively coupled directly or indirectly via one or more networks 118.

In some embodiments, the server 102 broadly represents one or more computers, such as a server farm, a cloud computing platform, or a parallel computer, virtual computing instances, and/or instances of a server-based application. The server 102 comprises a spend management layer 142 that is programmed or configured to host or execute functions including but not limited to managing buyer accounts associated with the one or more buyer computers 112*a-m* and supplier accounts associated with the one or more supplier computers 122*a-n*, and facilitating generation and maintenance of digital documents during procurement transactions between buyer accounts and supplier accounts, such as catalogs, purchase requisitions, purchase orders, or invoices. The server 102 also comprises a bundle database management layer 150 that is programmed or configured to host or execute functions including but not limited to managing bundles comprising digital objects for access by buyer computers 112*a-m* or supplier computers 122*a-n*, enabling creation, update, upload, download, notification, or administration of such bundles.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the bundle database management layer 150 can comprise computer-executable instructions, including bundle creation instructions 152, bundle upload and publishing instructions 154, and bundle download and editing instructions 156. In addition, the server 102 can comprise a data repository 140.

In some embodiments, the bundle creation instructions 152 enable creating a new bundle of digital objects. Enabling the creation may include allowing searching for or selecting existing digital objects, creating new digital objects, or associating multiple digital objects with one another. A digital object may represent a template form, a form created from a template form, a completed form, an attachment to a form, approval chain information governing the execution of the forms, or other data. A bundle is typically created first in a local database managed by a buyer device or another client device.

In some embodiments, the bundle uploading and publishing instructions 154 enable uploading or publishing a bundle. A bundle can be uploaded from the local database to a central repository managed by the server 102. Enabling the uploading or publishing may include automatically saving the bundle and new digital objects in the central repository, removing non-transferrable data from the bundle before publication, allowing specification of new metadata of the uploaded bundle, enforcing version control, or automatically generating alerts to the published bundle.

In some embodiments, the bundle downloading and editing instructions 156 enable downloading or editing a bundle. A bundle can be downloaded from the central repository to a local database. Enabling the downloading or editing may include allowing search for existing bundles in the central repository, automatically removing non-transferrable data from the bundle before download, automatically saving the bundle and new digital objects in the local database, or enforcing version control.

In some embodiments, the data repository 140 is programmed or configured to manage relevant data structures and store relevant data for functions performed by the server 102. In association with the bundle database management layer 150, the data may include supplier data, buyer data, transactional data including terms of early payment discounts, trends of prices or charges, or documents related to sourcing, ordering, invoicing, or other procurement activities as digital objects. The data can also include bundles of digital objects or associated metadata, including context scenarios, access permissions, access histories, or version histories.

In some embodiments, each of the buyer computers 112a-m broadly represents one or more computers, virtual computing instances, and/or instances of an e-procurement application program that are associated with an institution or entity that is related as a buyer with respect to a separate entity associated with one of the supplier computers 122a-n. One of the buyer computers 112a-m is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102. The one of the buyer computers 112a-m may comprise a desktop computer, laptop computer, tablet computer, smartphone, wearable device, or any other type of computing device that is capable of proper communication with the server 102 as well as adequate local data processing and storage. In some cases, one or more of the buyer computers 112a-m may be a personal computer or workstation that hosts or executes a browser and communicates via HTTP and HTML over the network 118 with a server-side e-procurement application hosted or executed at the server 102. In other cases, one or more of the buyer computers 112a-m may be a server-class computer and/or virtual computing instance that hosts or executes an instance of an e-procurement application that communicates programmatically via API calls, RPC or other programmatic messaging with the server 102.

Similarly, in some embodiments, each of the supplier computers 122a-n broadly represents one or more computers, virtual computing instances, and/or instances of an e-procurement application program that are associated with an institution or entity that is related as a supplier with respect to a separate entity associated with one of the buyer computers 112a-m. One of the supplier computers 122a-n may be programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102. Each of the supplier computers 122a-n may comprise a desktop computer, laptop computer, tablet computer, smartphone, wearable device, or any other type of computing device that is capable of proper communication with the server as well as adequate local data processing and storage. In some cases, one or more of the supplier computers 122a-n may be a personal computer or workstation that hosts or executes a browser and communicates via HTTP and HTML over network 118 with a server-side e-procurement application hosted or executed at the server 102. In other cases, one or more of the supplier computers 122a-n may be a server-class computer and/or virtual computing instance that hosts or executes an instance of an e-procurement application that communicates programmatically via API calls, RPC or other programmatic messaging with the server 102.

In some embodiments, each of the data source computers 132a-q broadly represents one or more computers, virtual computing instances, and/or instances of a data management application program with a communication interface. The data source computers 132a-q are programmed to manage one or more data sources, receive a request for certain data in the one or more data sources from the server 102, and send a response to the request to the server 102. One or more of the data source computers 132a-q can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the bundle database management layer 150, the server 102 is programmed to receive a request to upload a bundle from a first buyer computer of the buyer computers 112a-m. The server 102 is programmed to then sanitize or otherwise standardize the bundle and determine how to store the bundle in a central repository under version control. The server 102 is programmed to then receive a request to download the bundle from a second buyer computer of the buyer computers 112 a-m. The server 102 is programmed to specifically verify that a user account associated with the second buyer computer is allowed to download a certain version of the bundle, update the access history, and provide the certain version to the second buyer computer. The server 102 can also be programmed to transmit a list of bundles in the central repository to one of the buyer computers 112*a-m* or one of the supplier computers 122*a-n* for a specific context scenario, enabling the recipient of the list to download a version of a bundle on the list or causing the recipient to upload an updated version of the bundle on the list.

3. Functional Descriptions

In some embodiments, the server 102 is programmed to manage a central repository comprising a plurality of bundles. The central repository may be programmed to function as a community exchange for creating, storing, downloading and managing bundles. Each bundle comprises one or more digital objects. Examples of a digital object include a fillable form with executable rules, an executable template for such a form, another executable program, or a document. A bundle comprises an association of digital objects, in which each association has a unique identifier and may be digitally stored in a database record that comprises a plurality of columns each storing a reference to one of the digital objects. A bundle is saved in a local database, uploaded to a central repository, published in the central repository, and downloaded to a local database as a unit. A bundle can be accessed by any client system of the server 102, such as a buyer device or a supplier device, subject to access permissions associated with the bundle. The access permissions may control viewing or browsing, selection, download, updating an existing version, uploading a new version, or administration including creating or changing access permissions or other metadata of a bundle. These access permissions can be ranked such that an access permission having a higher rank automatically includes each access permission having a lower rank. A bundle can exist in multiple versions, and the access permissions can apply to all versions or an individual version.

3.1. Creating a Bundle

Figure 2:
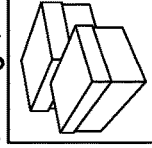
FIG. 2 illustrates one screen of a graphical user interface (GUI) for creating a bundle.

In some embodiments, the server 102 is programmed to enable the creation of a bundle, such as causing presentation of a graphical user interface (GUI) for the task by a client system. FIG. 2 illustrates one screen of a GUI for creating a bundle. The screen enables provision for the bundle a title via the field 202, a description via the field 204, and a thumbnail image via the field 206. The thumbnail image can be a screenshot of one or more of the digital objects in the bundle. The screen also enables provision of an attachment by specifying at least a type through the list of choices 208, which may include a file, a webpage, or text. An attachment is a digital object and generally contains supporting information that supplements other digital objects in the bundle or clarifies the context, organization, or usage of the bundle. Examples of an attachment include documentation of programming implementation for the bundle, recommendations for use of other bundles in connection with this bundle, or linking to success stories of using the bundle. An attachment as a file or webpage can be located in a local database, in a central repository managed by the server 102, or from a third-party data source. In addition, the screen shows a list of attachments 210 included in the bundle. The server 102 can be programmed to allow specification of different types of metadata for the bundle, such as tags that can be matched with keywords in search queries, context scenarios that can be used to determine when to surface the bundle, or access permissions for the bundle that would be used to determine how to access the bundle.

In some embodiments, the server 102 is programmed to further enable the creation of a bundle through additional screens of the GUI or other means. FIG. 3 illustrates one screen of a GUI for creating a bundle, including adding an existing digital object to the bundle. The digital object can be located in a local database or in a central repository managed by the server 102. The screen allows adding one or more digital objects to the bundle. For each digital object, the screen allows specification of a type via the type field 302 and a name via the name field 304. The type of a digital object may be an app as an executable program, a control module that controls how certain apps are to be executed, a fillable form with executable rules, a template form for such a fillable form, an approval chain that governs how a series of forms are to be approved, another governing policy, or another custom digital object. The name of the digital object can be specified by supplying verifiable text or selecting a name from a pre-populated list. The GUI can be configured to populate such a list with names of digital objects having the specified type and associated with access permissions that allow the viewing, selection, inclusion, or use of a digital object by a user account to which the GUI is presented. The digital object can be added to the bundle upon the specification of the type and the name or the selection of a separate submit button on the screen.

In some embodiments, the server 102 is programmed to first allow the creation of a custom digital object, such as a new form from scratch or based on a template form, before allowing adding the created digital object into a bundle. A template form, which may already be in the bundle, may have a field corresponding to every attribute of a database object and allows selection of one or more of those attributes for inclusion in a new form, which can also be added into the bundle. For example, the template form can correspond to one or more database tables for a sourcing event and be used to create a new sourcing form with fields that correspond to particular aspects of a sourcing event. For further example, the template form can correspond to one or more database tables for an approval process and be used to create a new approval chain with fields that correspond to particular aspects of an approval process. The approval chain would serve as a control module that dictates which approval is required for each form in the bundle or how the approval of one form triggers the processing of another form in the bundle. Alternatively, such rules for approval or execution flow can be directly incorporated into digital objects representing individual forms. For example, certain fields within a form can be associated with rules that will be automatically invoked upon the selection or completion of the field. In certain embodiments, the server 102 is programmed to save a created bundle, including newly created digital objects, on the client system.

3.2. Uploading and Publishing a Bundle

In some embodiments, the server 102 is programmed to allow publishing a bundle by a client system to a central repository managed by the server 102. The server 102 can be programmed to initially enable uploading the bundle from a local database into the central repository, which includes storing new digital objects and the bundle in the central repository. The server 102 is programmed to manage versions of each bundle in the central repository. When the initial version of a bundle is created from existing digital objects in the central repository, the server 102 is programmed to separately store the bundle, in terms of a listing of the digital objects, information regarding how to access the digital or the metadata thereof, access permissions associated with the bundle, versioning or general usage history of the bundle, or other metadata of the bundle. Additional versions of the bundle can subsequently be created and saved, as further discussed below.

Figure 4:
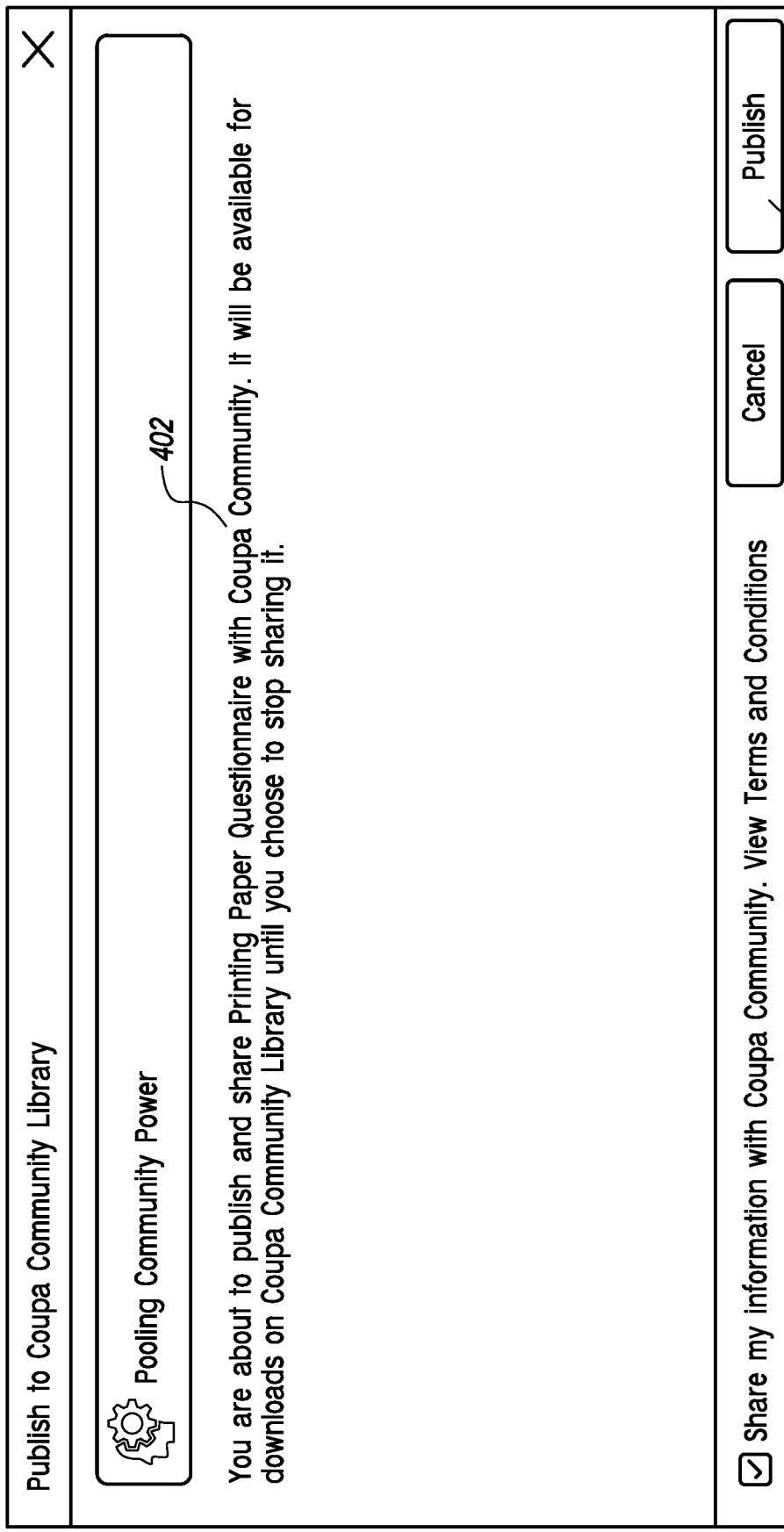
FIG. 4 illustrates a screen of a GUI for publishing a bundle in a central repository managed by a server computer to make the bundle accessible to all client systems subject to access permissions associated with the bundle.

In some embodiments, subsequent to the uploading, the server 102 can be programmed to allow further updating the bundle before publishing the bundle. FIG. 4 illustrates a screen of a GUI for publishing a bundle in the central repository to make the bundle accessible to all client systems of the server 102 subject to access permissions associated with the bundle. The screen indicates a link 402 to a central repository and allows publication of a bundle to the central repository via the option 404, which can also trigger a cleanup procedure, as further discussed below. As also illustrated in the screen, the server 102 can be programmed to allow termination of the publication so that the bundle remains in the central repository but is not accessible to the public or removal of the bundle from the central repository altogether.

In some embodiments, the server 102 is programmed to cleanup a bundle before publication. The server 102 can be programmed to maintain a blacklist of items to be sanitized from each bundle or specifically treated otherwise to facilitate reuse of the bundle by client systems. The blacklist can include data of a sensitive, non-transferrable, custom, or inappropriate nature.

In some embodiments, the server 102 is programmed to determine at a digital object level, whether any data needs to be removed or updated before publication or during subsequent downloading, as further discussed below. Each digital object may comprise one or more items, each having an indicator of whether the item is universal across client systems. For example, a form may have multiple fields, and each field may have a standard status meaning that the field readily corresponds to data found in the central repository, or a custom status meaning that the field corresponds to data that can only be found in a local database or cannot be readily identified from the central repository. For a custom status, an issue arises in the subsequent use of the bundle when a lookup function associated with the field is to be invoked to automatically populate a list of possible values or verify an entered value. To avoid that issue, depending on the value of the indicator, the server 102 is programmed to then determine whether to keep an item as is in a digital object, keep an item but require a mapping to locally stored data during a subsequent download, or remove an item from the digital object. Such determination can be based on user input.

In some embodiments, once a bundle is published, the server 102 is programmed to announce availability of the bundle to client systems. The notification can be a direct broadcast to all or select client systems based on notification preferences of the client systems. The notification can be pushed to client accounts or incorporated into the management of a list of bundles by a user account, as further discussed below. In addition, the server 102 can be programmed to perform context-specific notification. The server 102 can be programmed to identify contextual scenarios for the bundle, which can be part of the metadata of the bundle or separately specified by a client account, and cause display of an alert to the bundle when one of the contextual scenarios is encountered. For example, when a bundle comprises a template form for a sourcing event and a form created from the template form, an alert to the bundle can be displayed during the creation of a sourcing event.

3.3. Downloading and Editing a Bundle

Figure 5:
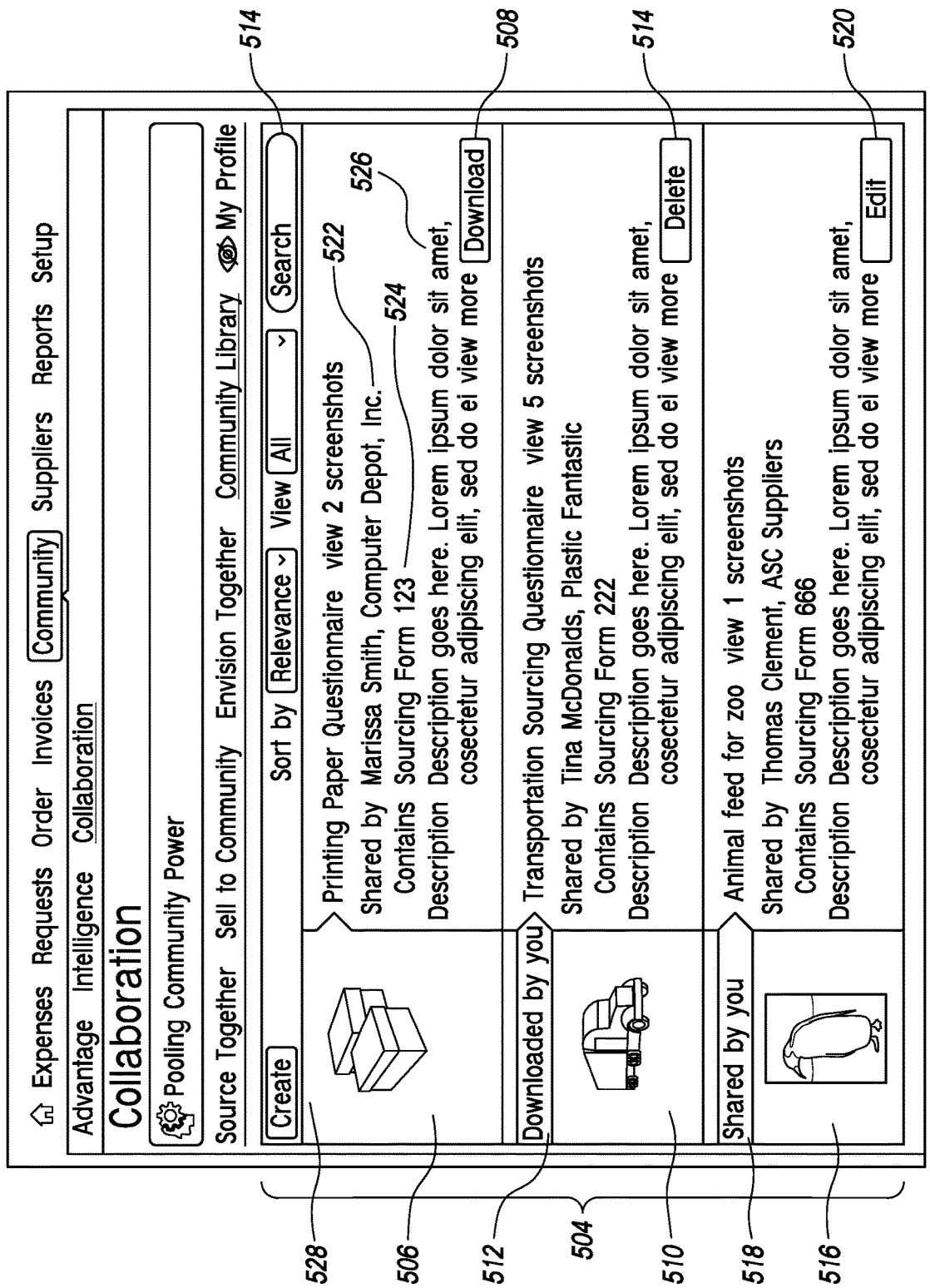
FIG. 5 illustrates a screen of a GUI for accessing a central repository of bundles managed by a server computer.

In some embodiments, the server 102 is programmed to enable access to bundles stored in the central repository. FIG. 5 illustrates a screen of a GUI for accessing a central repository of bundles managed by the server. The screen shows a listing of bundles 504 in the central repository, which includes at least entries 506, 510, and 516 corresponding to three bundles and can be a result of a search via the search tool 502. Any attribute of a bundle or associated metadata can be searched, such as the author, representative image, context information. While each bundle might have multiple versions, each entry could corresponding to the latest version. Each entry, such as the entry 506, includes various pieces of data related to the corresponding bundle, such as a thumbnail 528, author information 522, a description 526, or the name of a constituent digital object 524. Each entry can also include an indicator of how the bundle was accessed by the user account to which the GUI is presented. The bundle corresponding to the entry 506 was not previously accessed by the user account. Therefore, the entry 506 does not include such an indicator but includes a download option 508 for downloading the bundle to the local database, as further discussed below. The entry 510 includes an indicator 512 stating that the corresponding bundle was previously downloaded by the user account and also includes an option 514 for deleting the bundle from the local database. The entry 516 includes an indicator 518 stating that the corresponding bundle was previously shared or published to the central repository by the user account and includes an option 520 for editing the bundle or uploading an edited version.

In some embodiments, the server 102 is programmed to allow downloading of a bundle by a client system from the central repository to a local database, as noted above. The server 102 is programmed to verify that the client system is permitted to download, use, or update the bundle based on the access permissions associated with the bundle. While a cleanup of the bundle may be performed before publication, as discussed above, the server 102 can be programmed to perform at least part of the cleanup during the download of the bundle. Specifically, for an item of a digital object in the bundle having a custom status, as discussed above, the server 102 can be configured to request a re-mapping of the item of the digital object to locally stored data or to confirm removal of such an item from the digital object.

In some embodiments, in allowing downloading the bundle, the server 102 is programmed to create a new version of the bundle in the central repository in association with a user account of the client system. Alternatively, the server 102 is programmed to track the download but only create a new version for the bundle when the bundle having updates applied is uploaded to the central repository. In another embodiment, the server 102 is programmed to track the download but only create a new version when the bundle having updates applied is uploaded by the original author of the bundle. For the download, the server 102 is also programmed to create a copy of the bundle in the local database together with metadata related to the bundle, such as the version of the bundle or the location of downloaded version in the central repository. The server 102 can be programmed to also download copies of or links to any digital objects in the central repository that are not already in the local database.

Figure 6:
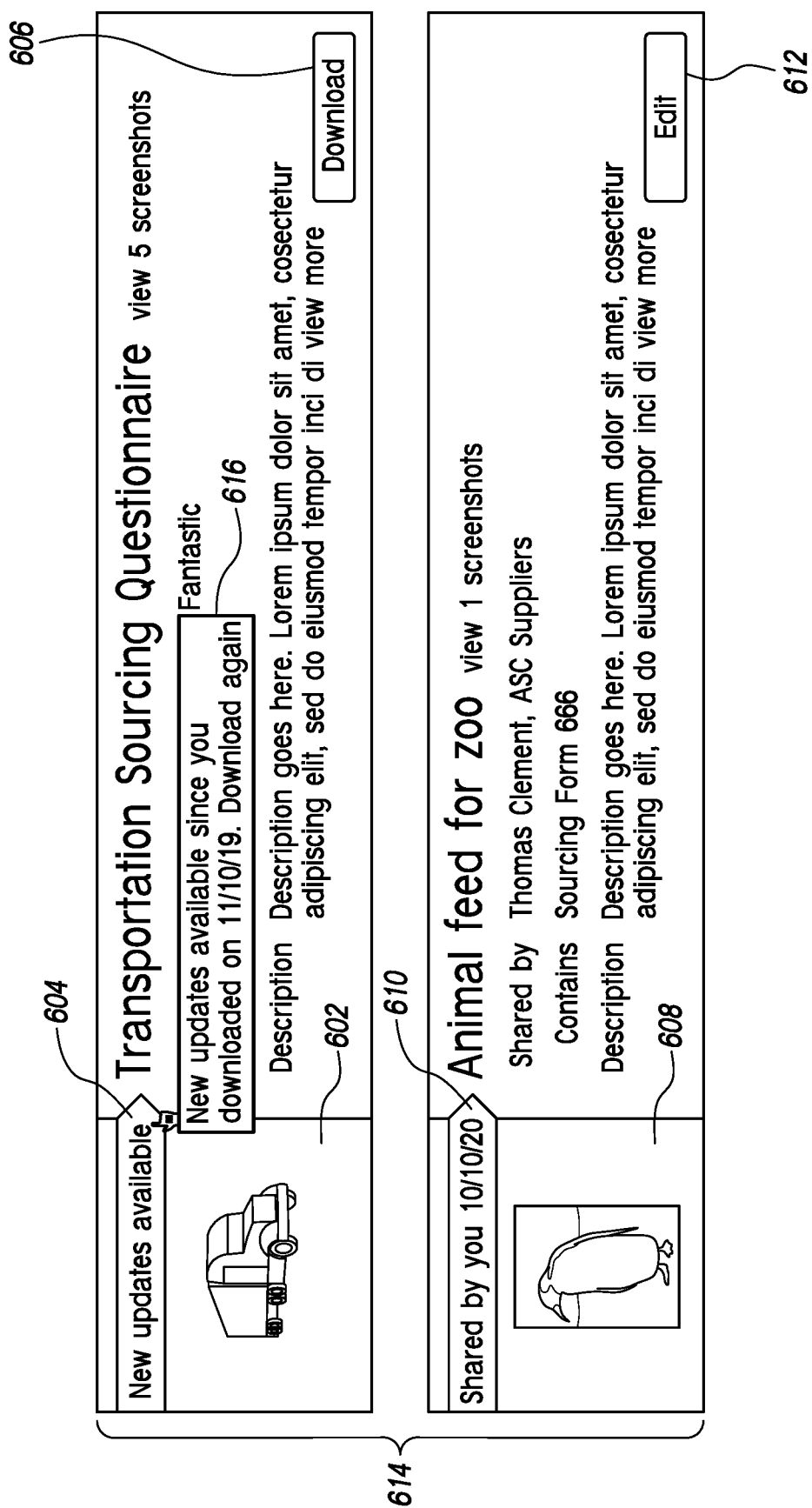
FIG. 6 illustrates a screen of a GUI for accessing a local database of bundles managed by a client system.

In some embodiments, the server 102 is programmed to enable access to bundles stored in the local database. These bundles can have been created from scratch or downloaded from the central repository. FIG. 6 illustrates a screen of a GUI for accessing a local database of bundles. The screen shows a listing of bundles 614 in the local database, which includes at least entries 602 and 608 corresponding to two bundles. Each entry includes various pieces of data related to the corresponding bundle, such as a thumbnail, author information, a description, or the name of a constituent digital object. Each entry can also include an indicator of how the bundle was accessed by the user account to which the GUI is presented. The entry 602 includes an indicator 604 stating that new updates are available, which means that the corresponding bundle is stored in the central repository and a new version or an updated current version is available for download in the central repository via the download option 606. In response to an interaction with the indicator 604, the GUI can be configured to display further information regarding the new updates via a popup, such as the banner 614 indicating when the new updates were made. An automatic upgrade of a bundle can also be implemented based on preferences of user accounts. The entry 608 includes an indicator 610 stating that the bundle was shared by the user account to which the GUI is presented on a previous date, which means that the corresponding bundle was uploaded to the central repository for download on that previous date. The entry 608 also includes an edit option 612 for editing the bundle ih the local database, which can later be uploaded again to the central repository.

In some embodiments, the server 102 is programmed to allow uploading the bundle from a local database into the central repository, as discussed above. When the bundle is created from a version of an original bundle in the central repository, the server 102 is programmed to determine how to handle the upload based on access permissions associated with the original bundle or that version. For example, the access permissions associated with the original bundle or the specific version may indicate no extension, then the bundle may not be uploaded from the local database or needs to be saved as a new bundle instead of a new version of the bundle in the central repository. For further example, the access permissions may indicate editing by the originally author only, then the bundle would be uploaded as a new version only when the upload is performed by the author. With proper access permissions, the server 102 can be programmed to create a new version or update the current version of the bundle for the upload, including storing the bundle with metadata in the central repository, updating the version history and access history of the bundle, or transmitting appropriate alerts to the availability of the new or updated version.

Figure 7:
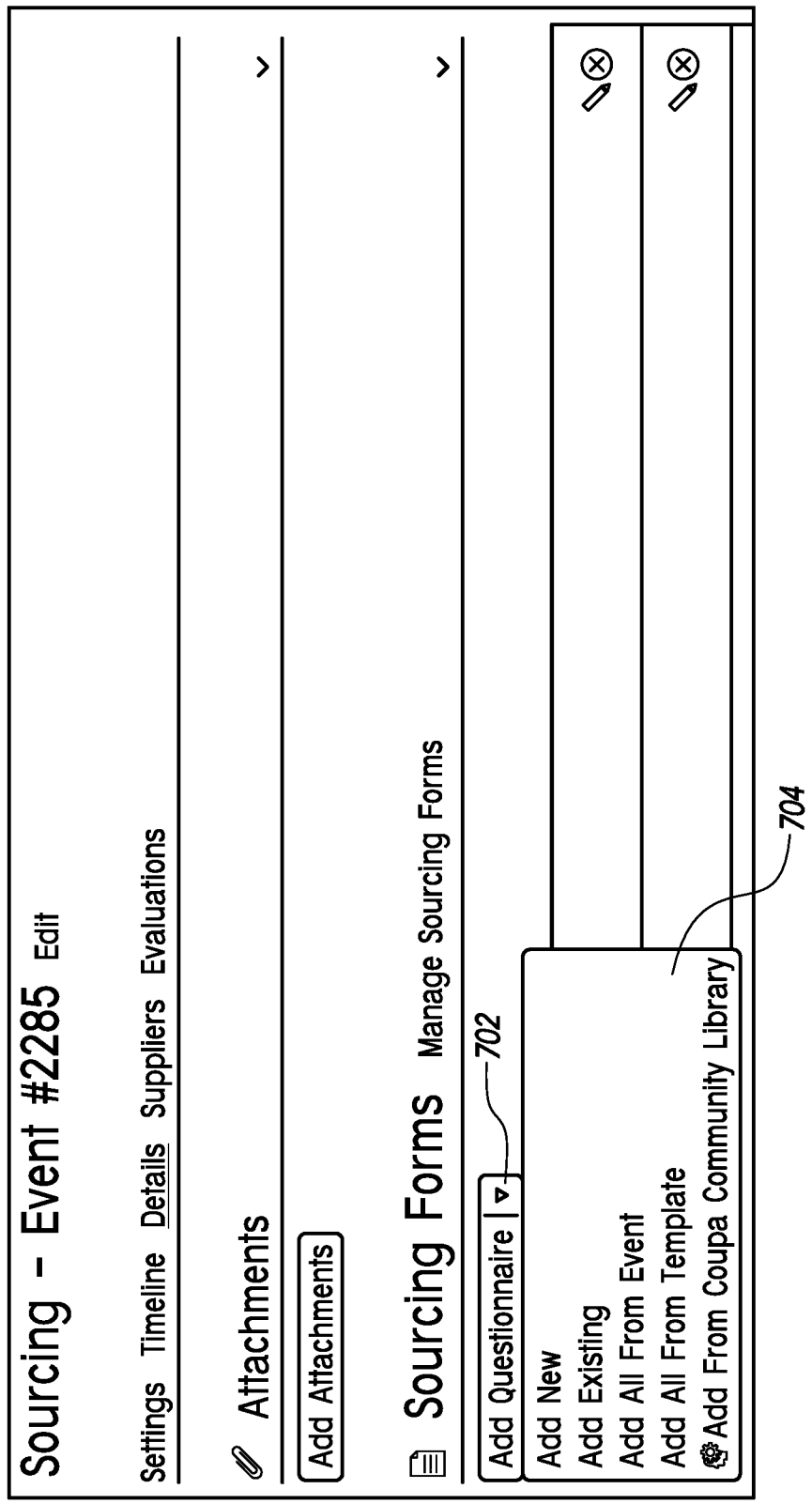
FIG. 7 illustrates a screen of a GUI for organizing an online sourcing event with a link to a central repository of bundles.

In some embodiments, the server is programmed to notify availability of a bundle in the central repository in specific contexts. FIG. 7 illustrates a screen of a GUI for organizing an online sourcing event with a link to a central repository of bundles. The screen allows inclusion of a questionnaire into the sourcing event via the option 702, which when selected provides a list of specific options. The list of options can allow adding questionnaires stored in the local database, or in the central repository via the specific option 704. A selection of the specific option 704 may lead to another screen similar to the one illustrated in FIG. 5 but with entries limited to those related to sourcing events, from which screen a bundle including one or more questionnaires can be downloaded and added to the sourcing event. The relevance of a bundle to a sourcing event can be determined from the tags or other metadata for the bundle, as discussed above. The server 102 can be programmed to also cause a general display of information regarding relevant bundles in any given context. For example, on the screen illustrated in FIG. 7 or another webpage that indicates resources for sourcing events, a link similar to the specific option 704 can be displayed in a fixed location that allows easy access to appropriate bundles in the central repository. For further example, in response to receiving a request to conduct a sourcing event from a buyer device, the server 102 can be programmed to send the link to the buyer device. In addition, the server 102 can be programmed to send the link based on access histories of the bundles, which indicate when or how a bundle is accessed and by whom. The server 102 can be programmed to detect trends in the access histories using any trend analysis technique known to someone skilled in the art, and surface the bundle when parameters of a trend is met.

4. Example Processes

Figure 8:
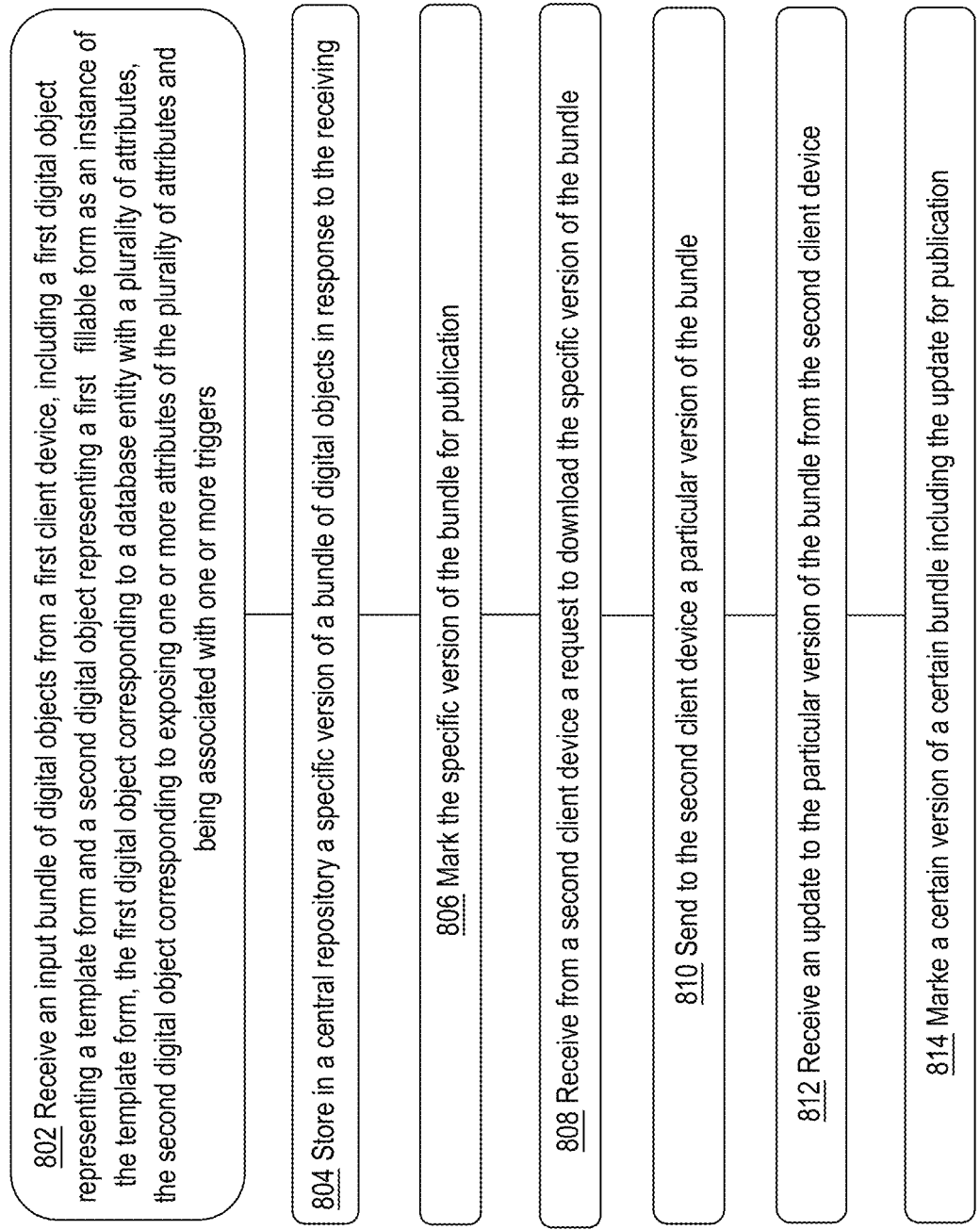
FIG. 8 illustrates an example process of managing bundles of digital objects by a server computer.
Figure 9:
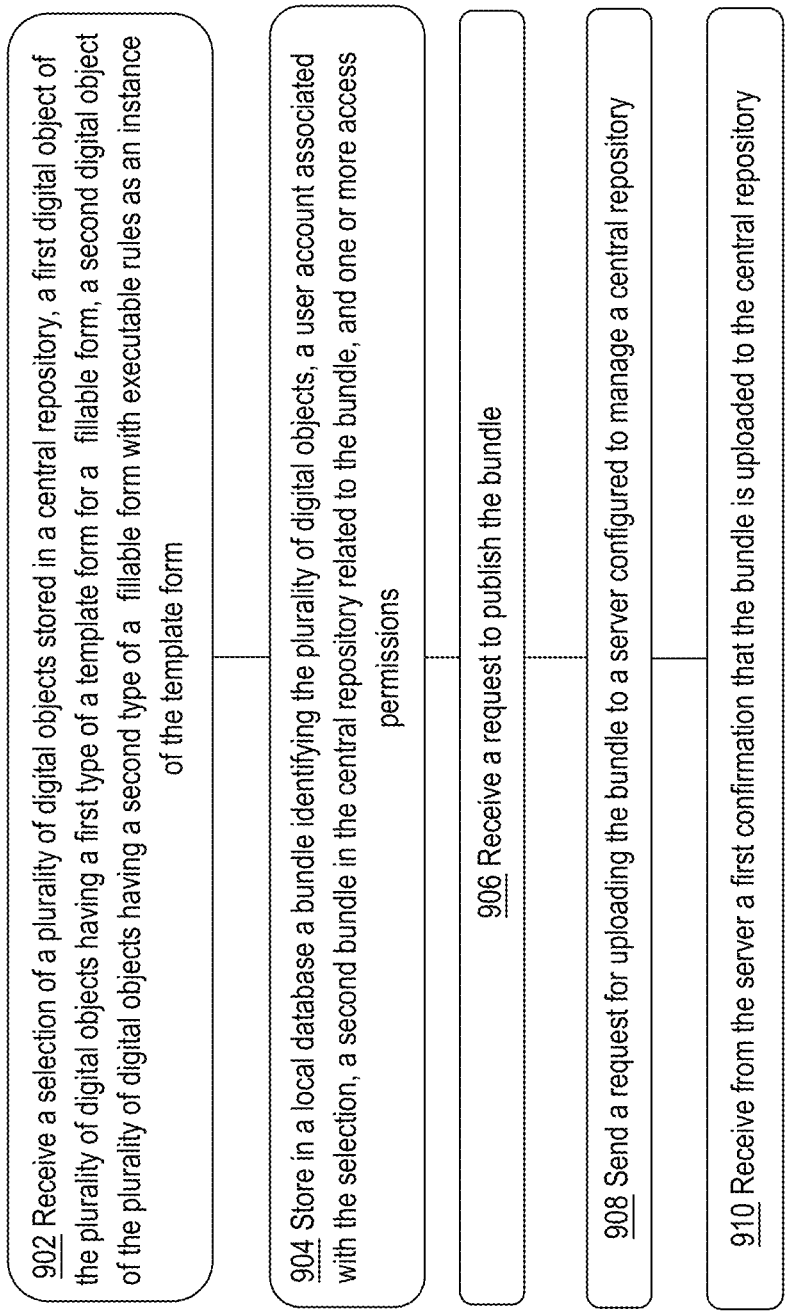
FIG. 9 illustrates an example process of managing bundles of digital objects by a client device.

FIG. 8 illustrates an example process of managing bundles of digital objects by a server computer. FIG. 9 illustrates an example process of managing bundles of digital objects by a client device. FIG. 8 and FIG. 9 are shown in simplified, schematic format for purposes of illustrating a clear example and other embodiments may include more, fewer, or different elements connected in various manners. FIG. 8 and FIG. 9 are each intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring to FIG. 8, in some embodiments, in step 802, the server 102 is programmed or configured to receive an input bundle of digital objects from a first client device, including a first digital object representing a template form and a second digital object representing a first fillable form as an instance of the template form. The first digital object corresponds to a database entity with a plurality of attributes. The second digital object corresponds to exposing one or more attributes of the plurality of attributes and being associated with one or more triggers.

In one embodiment, the second digital object represents a sourcing questionnaire. The first client device and the second client device are associated with buyer accounts.

In one embodiment, the digital objects further include a third digital object representing an approval chain indicating how the first fillable form is to be invoked upon an approval of a second form, how the first fillable form is to be approved, or how a third form is to be invoked upon an approval of the first fillable form.

In another embodiment, the digital objects further include a third digital object representing a second fillable form. In response to an interaction with the first fillable form, a trigger of the one or more triggers then causes an invocation the second fillable form.

In another embodiment, the bundle further involves an attachment indicating documentation of programming implementation for the bundle, recommendations for use of other bundles in connection with the bundle, or linking to success stories of using the bundle.

In some embodiments, in step 804, the server 102 is programmed or configured to store in a central repository a specific version of a bundle of digital objects in response to the receiving.

In one embodiment, the storing comprises saving a digital object in the input bundle that is not already in the central repository, saving bundle data of the input bundle identifying constituent digital objects, and saving metadata of the input bundle including access permissions.

In some embodiments, in step 806, the server 102 is programmed or configured to make the specific version of the bundle for publication.

In one embodiment, before marking the specific version in response to receiving the request, the server 102 is programmed to remove or certain data that satisfy certain criteria from the specific version of the bundle or flag the certain data, the certain criteria including non-transferability between client devices.

In some embodiments, the server 102 is programmed to cause presenting a graphical user interface by a second device showing a list of entries corresponding to a list of bundles in the central repository. Each entry of the list of entries indicates author information, a thumbnail, a description, and a name of constituent digital objects of a corresponding bundle. An entry of the list of entries includes a first option for downloading a corresponding bundle when the corresponding bundle is not available in a local database or has an update available in the central repository.

In some embodiments, in step 808, the server 102 is programmed or configured to receive from the second client device a request to download the specific version of the bundle.

In some embodiments, in step 810, the server 102 is programmed or configured to send to the second client device a particular version of the bundle.

In one embodiment, the sending comprises transmitting a request for remapping flagged data in the particular version of the bundle to data in a local database associated with the second client device.

In some embodiments, in step 812, the server 102 is programmed or configured to receive an update to the particular version of the bundle from the second client device.

In one embodiment, the update includes adding a third digital object representing a second fillable form as an instance of the template form or representing the first fillable form that is filled out.

In some embodiments, in step 814, the server 102 is programmed or configured to mark a certain version of a certain bundle including the update for publication.

In one embodiment, when the bundle is associated with a first access permission indicating that the bundle is not extendible, the certain version is a first version of the certain bundle. When the bundle is associated with a second access permission indicating that the bundle is to be updated only by an original author of the bundle, the certain version is a higher version than the specific version of the bundle when the original author is associated with the second client device.

In some embodiments, the server 102 is programmed to further identify a webpage related to a context scenario associated with the bundle, and incorporate a link for accessing the central repository into the webpage.

In some embodiments, the server 102 is programmed to maintain an access history for the bundle that tracks a viewing, selection, upload, download, update, or administration of the bundle by a user account or a client device. The server 102 is programmed to then identify from the access history one or more characteristics associated with a certain access level. The server 102 is programmed to next receive a specific request from a third client device to conduct an online activity, determine that the specific request matches the one or more characteristics, and transmit a response to the specific request including information regarding the bundle.

Referring to FIG. 9, in some embodiments, in step 902, a client device is programmed or configured to receive a selection of a plurality of digital objects stored in a central repository. A first digital object of the plurality of digital objects has a first type of a template form for a fillable form. A second digital object of the plurality of digital objects has a second type of a fillable form with executable rules as an instance of the template form.

In one embodiment, the template form corresponds to a database entity related to an approval chain for one or more forms.

In step 904, the client device is programmed or configured to storing in a local database a bundle identifying the plurality of digital objects, a user account associated with the selection, a second bundle in the central repository related to the bundle, and one or more access permissions;

In step 906, the client device is programmed or configured to receive a request to publish the bundle.

In some embodiments, in response to the request, the server 102 is programmed to remove certain data that satisfy certain criteria from the bundle or flag the certain data before sending the bundle to the server for publication.

In step 908, the client device is programmed or configured to send a request for uploading the bundle to a server configured to manage a central repository.

In step 910, the client device is programmed or configured to receive from the server a first confirmation that the bundle is uploaded to the central repository.

In some embodiments, the server 102 is programmed to send one or more updates to the bundle to the server, and receive from the server a second confirmation that a new version of the bundle is stored in the central repository based on the one or more updates.

In some embodiments, the server 102 is programmed to receive a selection of a specific bundle in the central repository, and send a specific request to the server to download the specific bundle. The server 102 is programmed to then receive a specific version of the specific bundle from the server. The server 102 is programmed to additionally remap flagged data of the specific version to data in the local database, and save the specific version with remapped data in the local database.

In some embodiments, the server 102 is programmed to detect an online activity involving a context scenario, and cause displaying information regarding a specific bundle in the central repository tagged with the context scenario. In response to the causing, the server 102 is programmed to receive a specific request to download the specific bundle.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 10:
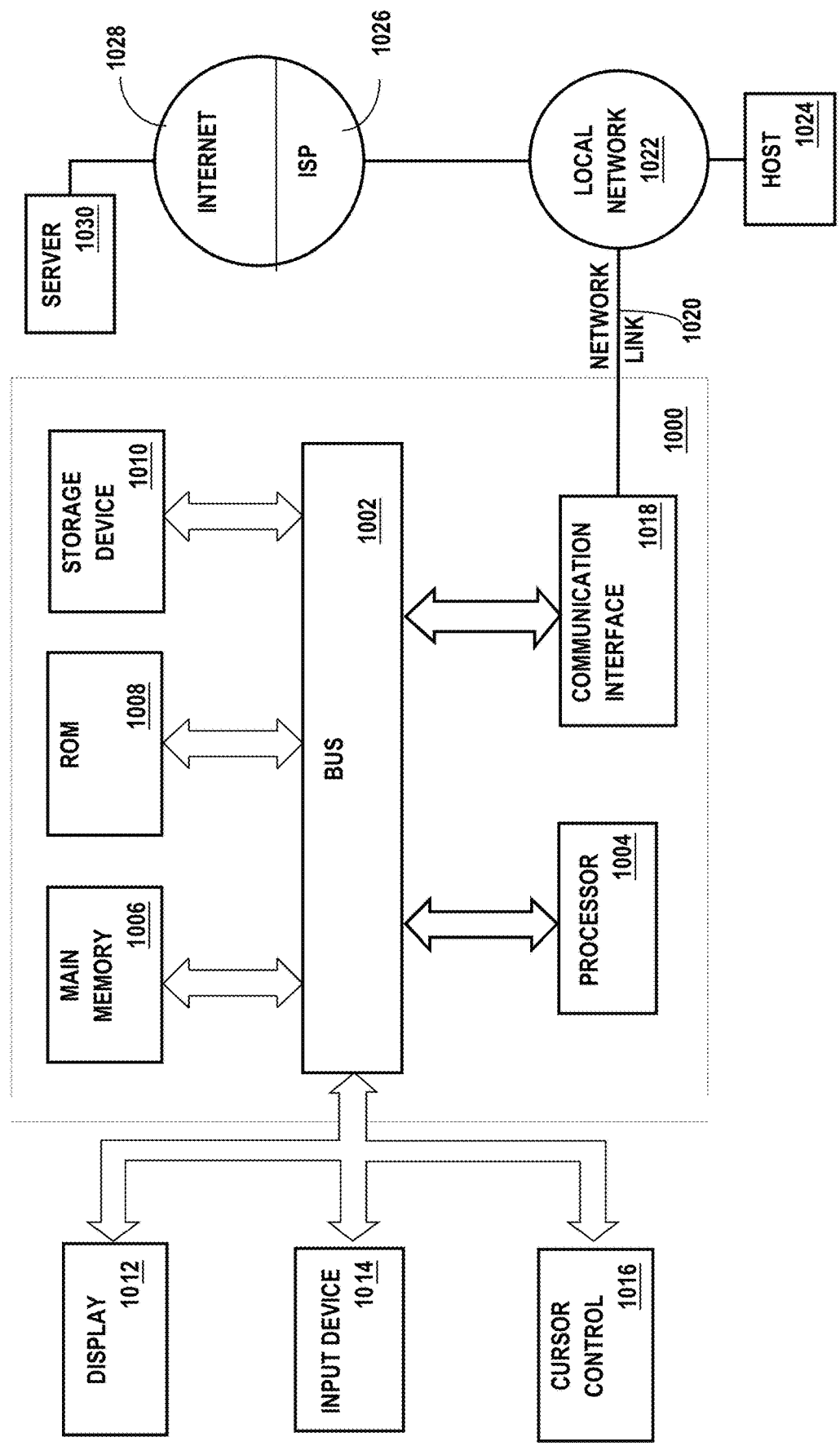
FIG. 10 is a block diagram that illustrates a computer system upon which an embodiment of the invention may be implemented.

FIG. 10 is a block diagram that illustrates an example computer system with which an embodiment may be implemented. In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which may include a bus and/or other communication mechanism(s) for communicating information and/or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller and/or a special-purpose microprocessor such as an embedded system or a graphics processing unit (GPU) or a digital signal processor or ARM processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as FLASH memory, or solid-state storage, magnetic disk or optical disk such as CD-ROM or DVD-ROM, and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1000 may be coupled via I/O subsystem 1002 to at least one output device 1012. In one embodiment, output device 1012 is a digital computer display. Examples of a display that may be used in various embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on display 1012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In another embodiment, computer system 1000 may comprise an internet of things (IoT) device in which one or more of the output device 1012, input device 1014, and control device 1016 are omitted. Or, in such an embodiment, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware and interfaces for generating position reporting packets, notifications, pulse or heartbeat signals, or other recurring data transmissions that specify a position of the computer system 1000, alone or in combination with other application-specific data, directed toward host 1024 or server 1030.

Computer system 1000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to bus 1002. Communication interface 1018 provides a two-way data communication coupling to network link(s) 1020 that are directly or indirectly connected to at least one communication networks, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a local area network (LAN), wide-area network (WAN), campus network, internetwork or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic or optical signals over signal paths that carry digital data streams representing various types of information.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices and/or computers that are operated by an Internet Service Provider (ISP) 1026. ISP 1026 provides data communication services through a world-wide packet data communication network represented as internet 1028. A server computer 1030 may be coupled to internet 1028. Server 1030 broadly represents any computer, data center, virtual machine or virtual computing instance with or without a hypervisor, or computer executing a containerized program system such as DOCKER or KUBERNETES.

Server 1030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1000 and server 1030 may form elements of a distributed computing system that includes other computers, a processing cluster, server farm or other organization of computers that cooperate to perform tasks or execute applications or services. Server 1030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1030 may comprise a web application server that hosts a presentation layer, application layer and data storage layer such as a relational database system using structured query language (SQL) or no SQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage 1010, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed:

1. A computer-implemented method of managing bundles of digital objects, comprising:
   receiving, by a processor, an input bundle of digital objects associated with an online procurement workflow from a first user account or client device, including a first digital object representing a template form, a second digital object representing a first fillable form and being an instance of the template form, and a third digital object representing a second fillable form, the first digital object corresponding to a database entity with a plurality of attributes, wherein the attributes correspond to at least one of a sourcing event and an approval chain, the second digital object corresponding to exposing one or more attributes of the plurality of attributes and being associated with one or more; triggers, the approval chain indicating how completion of the first fillable form triggers completion of the second fillable form;
   receiving, by the processor, an interaction with the first fillable form, comprising input, and in response thereto, a trigger of the one or more triggers causing an invocation of the second fillable form;
   storing, by the processor, in a central repository a specific version of a bundle of digital objects in response to the receiving, wherein the central repository functions as a community exchange for creating, storing, downloading, and managing bundles;
   marking the specific version of the bundle for publication, wherein the publication makes the specific version of the bundle available to all client systems in an organization subject to access permission;
   receiving from a second user account or client device a request to download the specific version of the bundle, wherein metadata associated with the specific version of the bundle comprises access permission data and access history data;
   determining bundle access permission associated with the specific version of the bundle in the central repository, wherein the associated metadata indicates the specific version of the bundle and the bundle access permission comprises metadata informing who can change the bundle access permission;
   sending to the second user account or client device a copy of the specific version of the bundle;

receiving an update to the copy of the specific version of the bundle from the second user account or client device;

marking the updated bundle as a first version of a new bundle if the bundle access permission does not include the second user account or client device;

marking the updated bundle as a new version including an update for publication if the bundle access permission includes the second user account or client device.

2. The computer-implemented method of claim 1, the digital objects further including a third digital object representing an approval chain indicating how the first fillable form is to be invoked upon an approval of a second form, how the first fillable form is to be approved, or how a third form is to be invoked upon an approval of the first fillable form.

3. The computer-implemented method of claim 1, the update including adding a third digital object representing a second fillable form as an instance of the template form or representing the first fillable form that is filled out.

4. The computer-implemented method of claim 1, the bundle further involving an attachment indicating documentation of programming implementation for the bundle, recommendations for use of other bundles in connection with the bundle, or linking to a description of using the bundle.

5. The computer-implemented method of claim 1, the storing comprising:

saving a digital object in the input bundle that is not already in the central repository;

saving bundle data of the input bundle identifying constituent digital objects.

6. The computer-implemented method of claim 1, further comprising:

when the bundle access permission indicates that the bundle is to be updated only by an original author of the bundle, the new version being a higher numbered version than the specific version of the bundle when the original author is associated with the second user account or client device.

7. The computer-implemented method of claim 1, further comprising:

identifying a webpage related to the sourcing event associated with the bundle, wherein the webpage either provides resources for setting up the sourcing event or enables organization of the sourcing event;

incorporating a link for accessing the central repository into the webpage.

8. The computer-implemented method of claim 1, further comprising:

the access history data for the bundle tracking a viewing, selection, upload, download, update, or administration of the bundle by the user account or the client device;

identifying from the access history data one or more characteristics associated with an access level;

receiving a specific request from a third user account or client device to conduct an online activity;

determining that the specific request matches the one or more characteristics;

transmitting a response to the specific request including information regarding the bundle.

9. The computer-implemented method of claim 1, further comprising before marking the new version, removing data that satisfy predetermined criteria from the new version of the bundle or flagging the data, the predetermined criteria including non-transferability between client devices.

10. The computer-implemented method of claim 1, the sending comprising transmitting a request for remapping flagged data in the particular version of the bundle to data in a local database associated with the second client device.

11. The computer-implemented method of claim 1, further comprising:

causing presenting a graphical user interface showing a list of entries corresponding to a list of bundles in the central repository;

each entry of the list of entries indicating author information, a thumbnail, a description, and a name of constituent digital objects of a corresponding bundle;

an entry of the list of entries including a first option for downloading a corresponding bundle when the corresponding bundle is not available in a local database or has an update available in the central repository.

12. The computer-implemented method of claim 1, the second digital object representing a sourcing questionnaire;

the first user account or client device and the second user account or client device being associated with buyer accounts.

13. One or more non-transitory computer-readable storage media storing sequences of instructions which when executed cause one or more hardware processors to perform a computer-implemented method of managing bundles of digital objects, the method comprising:

receiving an input bundle of digital objects associated with an online procurement workflow from a first user account or client device, including a first digital object representing a template form a second digital object representing a first fillable form and being an instance of the template form, and a third digital object representing a second fillable form, the first digital object corresponding to a database entity with a plurality of attributes, wherein the attributes correspond to at least one of a sourcing event and an approval chain, the second digital object corresponding to exposing one or more attributes of the plurality of attributes and being associated with one or more triggers, the approval chain indicating how completion of the first fillable form triggers completion of the second fillable form;

receiving, by the processor, an interaction with the first fillable form, comprising input, and in response thereto, a trigger of the one or more triggers causing an invocation of the second fillable form;

storing in a central repository a specific version of a bundle of digital objects in response to the receiving, wherein the central repository functions as a community exchange for creating, storing, downloading, and managing bundles;

marking the specific version of the bundle for publication, wherein the publication makes the specific version of the bundle available to all client systems in an organization subject to access permission;

receiving from a second user account or client device a request to download the specific version of the bundle, wherein metadata associated with the specific version of the bundle comprises access permission data and access history data;

determining bundle access permission associated with the specific version of the bundle in the central repository, wherein the associated metadata indicates the specific version of the bundle and the bundle access permission comprises metadata informing who can change the bundle access permission;

sending to the second user account or client device a copy of the specific version of the bundle;

receiving an update to the copy of the specific version of the bundle from the second user account or client device;

marking the updated bundle as a first version of a new bundle if the bundle access permission does not include the second user account or client device marking the updated bundle as a new version including an update for publication if the bundle access permission includes the second user account or client device.

* * * * *